Oct. 24, 1967    D. R. SAWLE    3,348,452
MINIATURE ROCKET DEFENSE SYSTEM
Filed March 3, 1965    2 Sheets-Sheet 1

INVENTOR
David R. Sawle
by:
Edwin E. Greigg
ATTORNEY

Oct. 24, 1967  D. R. SAWLE  3,348,452

MINIATURE ROCKET DEFENSE SYSTEM

Filed March 3, 1965  2 Sheets-Sheet 2

INVENTOR
David R. Sawle
BY Edwin E. Greigg
ATTORNEY

3,348,452
MINIATURE ROCKET DEFENSE SYSTEM
David R. Sawle, Berkeley, Calif., assignor to
MB Associates, a corporation of California
Filed Mar. 3, 1965, Ser. No. 437,350
3 Claims. (Cl. 89—1.807)

The present invention relates to miniature rocket systems and, more particularly, to a rocket system which is capable of defeating a guided aircraft rocket.

The present invention utilizes a launcher system comprising several salvos of miniature rockets. Each salvo consists of several individual launching tubes each containing five or more miniature rockets. The system can utilize radar to establish both range and angular position, and the miniature rockets are then fired automatically on the basis of the radar fire control system. If the guided aircraft rocket has a capability of defeating the aircraft within twenty feet of same, it is important that the miniature rocket salvo experiences a high hit probability, for example 95%, at a distance substantially greater than twenty feet and within the maximum possible cone angle around the aircraft axis.

Accordingly, it is the principal object of the present invention to provide an aircraft mounted miniature rocket system for defeating a guided aircraft rocket.

Another object of the present invention is to provide a minature rocket system wherein multiple rockets are launched simultaneously with a hit probability of greater than 90%.

Another object of the present invention is to provide a miniature rocket system having the advantages of no recoil and better trajectory control.

Further objects and advantages of the present invention will become apparent from the following discussion, appended claims and the accompanying drawings, in which:

FIG. 1 depicts the operation of the miniature rocket system deploying a salvo of 108 rounds for a hit probability (kill probability) of 95%. These factors are based upon the following conditions:

Table 1

| | |
|---|---|
| Aiming accuracy _____ mils__ | 15 |
| Round dispersion _____ do____ | 15 |
| Missile velocity _____ ft./sec__ | 3000 |
| Aircraft velocity _____ ft./sec__ | 800 |
| Number of rounds fired _____ | 108 |
| Kill probability _____ percent__ | 95 |
| Kill distance _____ ft__ | 50 |
| Missile aircraft separation at time of firing rockets _____ ft__ | 186 |
| Array 108 launchers _____ array__ | 9x12 |
| System size 9 x 12½" launcher _____ | (¹) |
| Burning time _____ msec__ | 40 |
| Launcher length _____ ft__ | 1.5 |
| Muzzle velocity _____ ft./sec__ | 300 |
| Burnout velocity _____ ft./sec__ | 1200 |
| Time to target _____ msec__ | 62 |

¹ Approximately 6 x 8 in. x 24 in. long.

Figure 1:
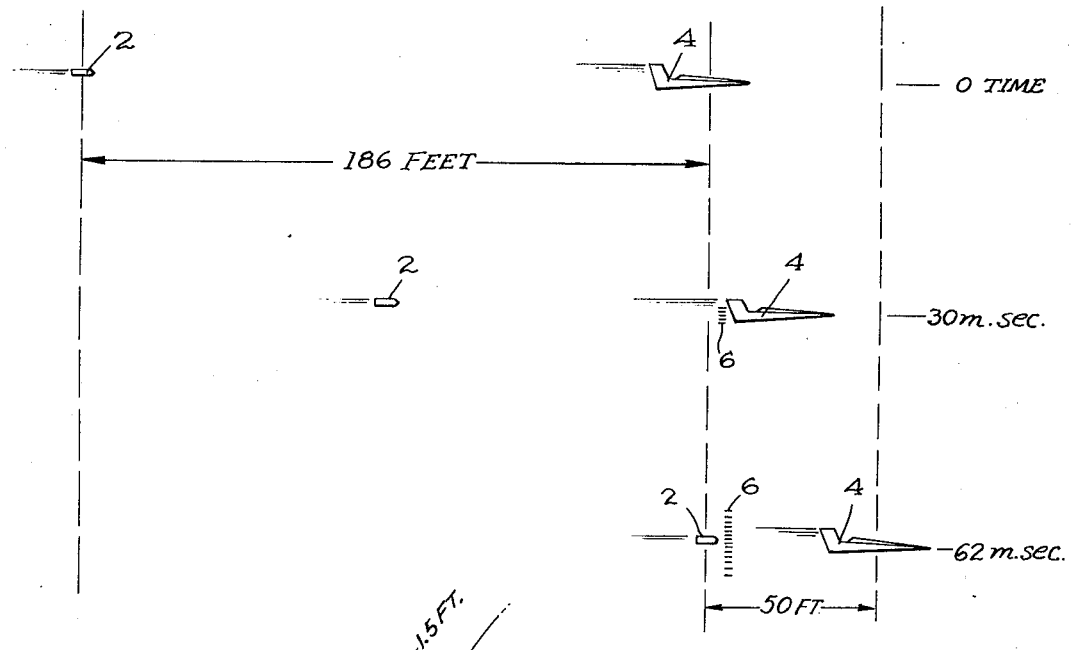
FIGS. 1, 2 and 3 are schematic illustrations of the time and distance factors in the fire control problem embodied by the present invention.

From the above table, and as shown in FIG. 1, it will be seen that the miniature rocket salvo defeats the guided aircraft rocket (GAR) at a minimum kill distance of fifty feet to the rear of the aircraft. Distances to a few hundred feet are conceivable.

Figure 2:
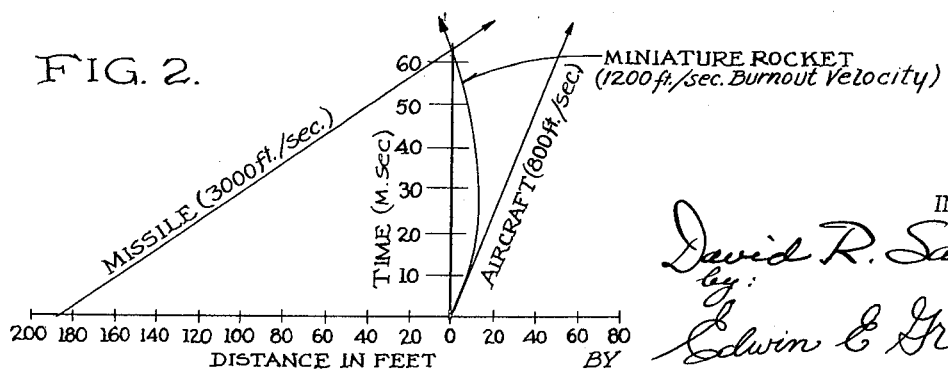

FIG. 2 is a graphic representation of this relationship wherein the velocity of the GAR 2 is plotted against the velocity of the aircraft 4.

The firing of the miniature rocket salvo 6 is initiated when the GAR aircraft separation is 186 feet and, as shown in the graph, it requires 62 seconds for the rocket salvo 6 to contact the GAR 2 at a distance of fifty feet from the aircraft.

The hit probability can be determined from the equation:

$$P_H = 1 - e^{-\frac{N}{2(\sigma^2 + \alpha^2)}\left(\frac{r}{R}\right)^2}$$

where $\sigma$ is dispersion; $\alpha$ is the aiming error; $r$ is the target radius; $R$ is the target range; and $N$ is the number of rounds fired.

For a $P_H$ of 0.95 the exponent must be equal to 3 or $$\frac{N}{2(\sigma^2 + \alpha^2)}\left(\frac{r}{R}\right)^2 = 3$$

Assuming a 0.25 ft. radius target at fifty feet with $\sigma$ equal to 15 mils and $\alpha$ the aiming error equal to 15 mils, the number of rounds required in the salvo is:

$$N = 6(\sigma^2 + \alpha^2)\left(\frac{R}{r}\right)^2$$
$$= 6(15^2 + 15^2)\left(\frac{50}{.025}\right)^2 \times 10^{-6}$$
$$= 6 \times 450 \times 4 \times 10^4$$
$$= 108$$

The equation for the aiming error is given by the following:

$$\frac{\alpha}{\beta} = K\frac{V_e}{V_r} + 1$$

where $K$ is a constant (for most cases it is between 2.5 and 4); $V_e$ is average velocity of the enemy missile; $V_r$ is the average velocity of the miniature rocket; and $\beta$ is the tracking error.

For an aiming error of 15 mils as seen in Table 1, it is necessary that the radar have a tracking accuracy of 1 to 2 mils. To achieve this with a small antenna, it is necessary to operate at short wave lengths ($\sim$/cm., K band) which should be satisfactory since only a very short range ($\sim$500 ft.) and low power (in the milliwatt range) are required. Estimates indicate an antenna of 1 to 2 feet diameter will be satisfactory. In addition to utilizing a radar tracking system at 1 to 2 mils accuracy, the invention may be compatible with an IR (infrared) detection system with ths same tracking accuracy of 2 mils in combination with a radar ranging system for effecting fire control for the minature rocket salvo.

Figure 3:
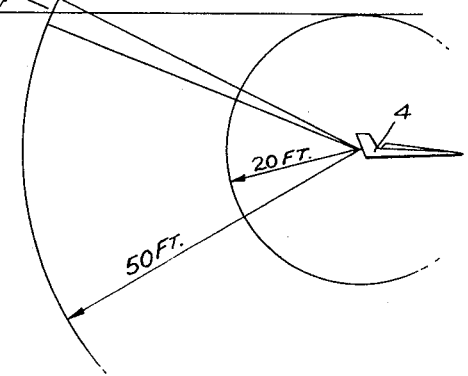

FIG. 3 depicts the last part of the GAR trajectory (100 to 500 ft.) as it approaches the aircraft. During the latter part of its flight, the GAR makes only very small corrections since it has a relatively large turning radius. Assuming a 5 G maximum turn, the turning radius is $$R_t = \frac{V^2}{a} = \frac{(3000 \text{ ft./sec.})^2}{5 \times 32.2 \text{ ft./sec.}^2} = 56,000 \text{ ft.}$$

This means that during the last 500 feet, the trajacetory appears as if it were a straight line as shown in FIG. 3. However, with a capability of defeating the aircraft at 20 feet and using 50 feet as the distance at which the miniature rocket salvo defeats the GAR, a crossing angle of as much as 20 ft./50 ft. or 23.6° is possible. This crossing angle means the ignition timing and the velocity variation should be held below ±1 millisecond or $$\pm \frac{r \text{ GAR}}{V \sin \alpha}$$

where $r$ GAR is the radius of the GAR and $V \sin \alpha$ is the lateral velocity of the rockets. For this case under consideration timing error should be less than $$\pm \frac{0.2}{400 \text{ ft./sec.} \times 0.4} \approx \pm 1 \text{ millisecond}$$

The variation in ignition time and time of flight of the miniature rocket salvo is extremely important. If the ±1 millisecond requirement cannot be achieved, then a greater number of rockets will be required to give the required hit probability due to possible timing error or a lower hit probability is accepted for the less likely case of large crossing angles.

It is desirable for the rocket of the present invention to achieve a 400 ft. per second velocity in a minimum amount of time since the rocket will be flying backwards as it leaves the aircraft due to the aircraft's 800 ft. per second velocity. Once the rocket is traveling 400 ft. per second, the difference between the aircraft's 800 ft. per second and its 400 ft. per second is also 400 ft. per second. Since the rocket is gyroscopically stable flying forward at 400 ft. per second, it will be stable flying backward at that velocity provided the drag coefficients are not radically different. 400 ft. per second is achieved by the time the rocket is about two feet from the end of the launcher. Since it will not see undisturbed atmosphere in that time, it will not see the full aircraft velocity.

Figure 4:
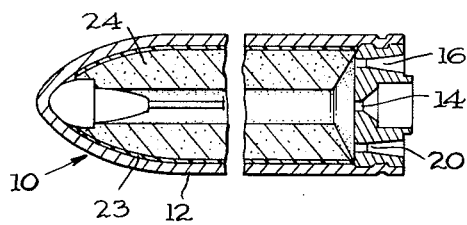
FIG. 4 is a horizontal cross-sectional view of the miniature rocket design of the present invention.

FIG. 4 depicts a 13 mm. rocket 10 having an 11.8 gram case 12 and a loaded weight of 15 grams. It achieves a burnout velocity of 1200 ft. per second.

Figure 5:
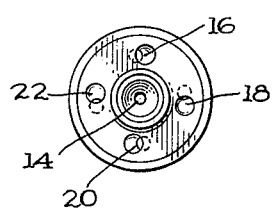
FIG. 5 is a plan view of the embodiment shown in FIG. 4.
Figure 6:
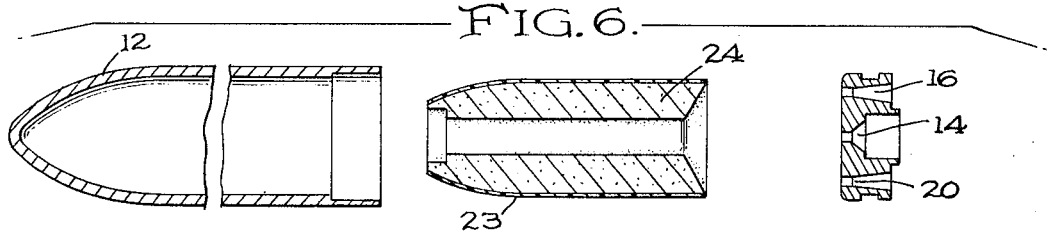
FIG. 6 is an exploded view of the rocket design illustrated in FIG. 4.
Figure 7:
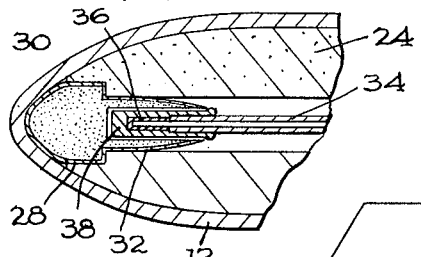
FIG. 7 is an enlarged horizontal cross-sectional view of the nose portion of the rocket design illustrated in FIG. 4.
Figure 8:
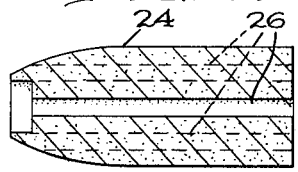
FIG. 8 is a horizontal cross-sectional view of a preferred embodiment of the propellant utilized in the rocket design illustrated in FIG. 4.
Figure 9:
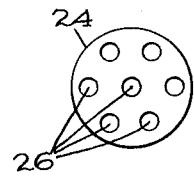
FIG. 9 is a plan view of the illustration shown in FIG. 8.

FIG. 5 shows the nozzle portion of the rocket 10 having a center nozzle 14 and four peripheral or radially oriented nozzles 16, 18, 20, 22, each having a skewed axis with respect to the rocket axis. The propellant 24, as best seen in FIGS. 6, 8 and 9, comprises seven axially aligned perforations 26 which act to decrease the web thickness to 64 mils. This results in a reduced burning time and increased burning area which will appreciably increase the acceleration such that it will achieve the 400 ft. per second in a short launcher. Normally, an inhibitor 23, as seen in FIG. 6, is not necessary. It is important that the rocket have a minimum of ignition delay. Accordingly, in FIG. 7 there is shown a short ignition time system which has a ±2 milliseconds delay. This system comprises a closed polyethylene tube 28 containing loose powder 30 (LR-28). The polyethylene tube 28 forms a plastic sack 32 surrounding an enameled wire 34. The wire has ⅛ inch of its ends scraped clean for receiving an aquadag coating 36. This portion of the wire is embedded in lead styphnate 38.

Figure 10:
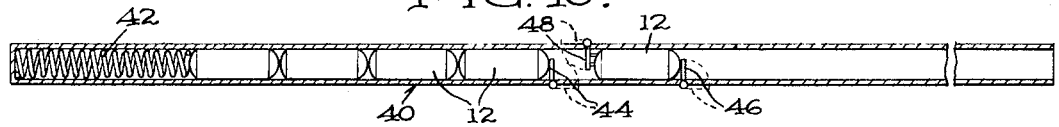
FIG. 10 is a horizontal cross-sectional view of an individual launcher tube.

In FIG. 10 there is shown a single launcher utilized in the launcher array system of the present invention. The launcher 40 is designed to hold five rockets which are held against the biasing action of a spring 42 by a motor actuated load latch 44. FIG. 10 shows the stage when the first of the five rockets is ready to be fired. The motor actuated load latch 44 has been released allowing the first rocket to slide forward against the spring loaded forward catch 46. The motor actuated load latch is then operated to push the remaining rockets in a rearward direction, thus providing a space in which the position and ignition latch 48 can be operated. The foremost rocket is then fired by means of the ignition latch 48.

Figure 11:
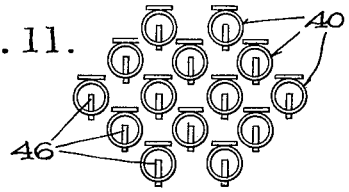
FIG. 11 is a plan view of the launcher array system embodied by the present invention.
Figure 12:
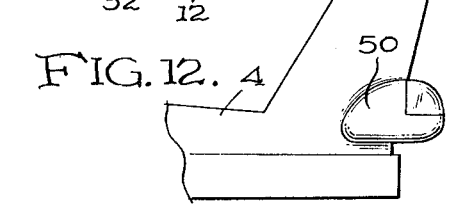
FIG. 12 is a horizontal elevational view showing the miniature rocket system mounted on the aircraft.
Figure 13:
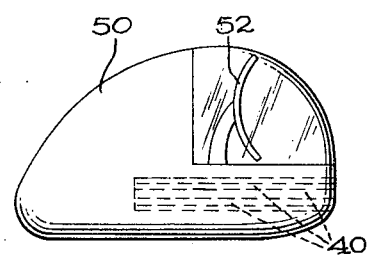
FIG. 13 is an elevational view of the housing for the launcher array system and the radar tracking system.
Figure 14:
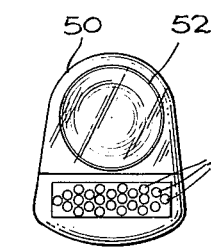
FIG. 14 is a plan view of the embodiment illustrated in FIG. 13.

FIG. 11 shows a typical array of rocket launchers embodied in the present invention. This array of launchers is best depicted in FIGS. 13 and 14 in a suitable housing 50 for the radar tracking system 52. The housing is mounted at the rear of the aircraft 4 as shown in FIG. 12. Normally, it is possible to fire five salvos of miniature rockets, although the system can be designed for double this capacity if desired. The weight of five salvos of rockets would be about 25 lbs.

It is possible to consider a system in which the rockets are not aimed, but only fill up the space within a 4° by 4° angle. At fifty feet this is a radius of 3.5 feet or an area of 38.5 square feet. Since the attacking missile has an area of typically 0.2 square foot, if a perfect pattern could be made with the miniature rockets, it would require only $$\frac{38.5}{0.2} = 192.5$$

Actually to achieve a 95% hit probability, it would require 500 to 1000 miniature rockets depending upon dispersion. This approach is useful for small cone angles around the axis of the aircraft.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What I claim is:

1. In a rocket launching tube, the combination comprising: a plurality of rockets axially aligned in said tube, a biasing means in said tube, means mounted on said tube for holding and shifting rearwardly all but the foremost rocket of said rockets against said biasing means for creating a space in said tube between the remaining portion of said rockets and said foremost rocket, means mounted on said tube for holding said foremost rocket in firing position, and firing means mounted on said tube and positioned to operate within said space for firing said foremost rocket from said tube.

2. In a rocket launching tube, the combination comprising: a plurality of rockets axially aligned in said tube, a biasing means in said tube, means mounted on said tube for holding and shifting all but the foremost rocket rearwardly in said tube against said biasing means, thereby creating a space between the foremost rocket and the adjacent rocket, means mounted on said tube for holding said foremost rocket in a firing position, and firing means mounted on said tube and positioned to operate within said space for firing said foremost rocket from said tube.

3. In a device according to claim 2, wherein said holding and shifting means is pivotally mounted on said tube for shifting said rockets during an arcuate swing thereof.

References Cited

UNITED STATES PATENTS

| | | | |
|---|---|---|---|
| 2,313,030 | 3/1943 | Tauschek | 89—1 X |
| 2,853,946 | 9/1958 | Loedding | 102—49 |
| 2,938,434 | 5/1960 | Myron | 89—1.815 |
| 2,988,961 | 6/1961 | Berg | 89—1.801 |
| 3,139,795 | 7/1964 | Altschuler | 89—1.818 |
| 3,199,406 | 8/1965 | Gould | 89—1.816 X |

SAMUEL W. ENGLE, *Primary Examiner.*